United States Patent
Schmölz

(10) Patent No.: US 11,456,651 B2
(45) Date of Patent: Sep. 27, 2022

(54) MOUNTING DEVICE, SYSTEM COMPRISING A MOUNTING DEVICE AND A ROTOR, AND METHOD

(71) Applicant: GROB-WERKE GmbH & Co. KG, Mindelheim (DE)

(72) Inventor: Markus Schmölz, Rieden (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 3 days.

(21) Appl. No.: 17/166,825

(22) Filed: Feb. 3, 2021

(65) Prior Publication Data

US 2021/0242757 A1 Aug. 5, 2021

(30) Foreign Application Priority Data

Feb. 5, 2020 (DE) .......................... 102020102945.4
Mar. 23, 2020 (EP) ..................................... 20165017

(51) Int. Cl.
*B23P 19/00* (2006.01)
*H02K 15/03* (2006.01)
*H02K 1/27* (2022.01)
*H02K 15/12* (2006.01)

(52) U.S. Cl.
CPC .............. *H02K 15/03* (2013.01); *H02K 1/27* (2013.01); *H02K 15/12* (2013.01); *Y10T 29/5313* (2015.01)

(58) Field of Classification Search
CPC .......... H02K 15/03; H02K 1/276; H02K 1/27; H02K 1/28; Y10T 29/49009; Y10T 29/49012; Y10T 29/53143; Y10T 29/5313
USPC .......... 29/729, 596, 598, 607, 609, 732, 738
See application file for complete search history.

(56) References Cited

U.S. PATENT DOCUMENTS 8,400,029 B2 * 3/2013 Sugimoto ................ H02K 1/20
310/58
2004/0195926 A1 * 10/2004 Hiwaki .................. H02K 1/146
310/214

FOREIGN PATENT DOCUMENTS

| CN | 107086735 A | 8/2017 |
| CN | 207251402 U | 4/2018 |
| CN | 208939789 U | 6/2019 |
| EP | 2571148 A1 | 3/2013 |
| JP | 2016208695 A | 12/2016 |
| KR | 101972348 B1 | 4/2019 |

OTHER PUBLICATIONS

European Search Report; priority document.

* cited by examiner

*Primary Examiner* — Thiem D Phan
(74) *Attorney, Agent, or Firm* — Greer, Burns & Crain, Ltd.

(57) ABSTRACT

A mounting device for inserting magnets into magnet accommodating portions of a rotor of an electric machine. The mounting device comprises an aligning device configured to accommodate and align the magnets by means of at least one channel. In this case, a shape of the at least one channel is adapted to a shape of the magnets. The channel comprises a channel inlet, which is disposed at an end face of the aligning device and via which the magnets can be fed to the channel, and a channel outlet, which is disposed opposite the channel inlet and is disposed at an end face of the aligning device opposite the end face and via which the magnets can be discharged from the channel. Furthermore, the at least one channel is twisted.

15 Claims, 9 Drawing Sheets

MOUNTING DEVICE, SYSTEM COMPRISING A MOUNTING DEVICE AND A ROTOR, AND METHOD

CROSS-REFERENCES TO RELATED APPLICATIONS

This application claims the benefit of the German Application No. 102020102945.4, filed on Feb. 5, 2020, and of the European patent application No. 20165017.3 filed on Mar. 23, 2020, the entire disclosures of which are incorporated herein by way of reference.

FIELD OF THE INVENTION

The invention relates to a mounting device for inserting magnets into magnet accommodating portions of a rotor of an electric machine. The invention also includes a system comprising a rotor and the mounting device according to the invention, and a method for inserting magnets into magnet accommodating portions of a rotor of an electric machine.

BACKGROUND OF THE INVENTION

Electric machines are understood to be, in particular, machines for converting electric energy into kinetic energy and/or machines for converting kinetic energy into electric energy. In particular, this term is to be understood to mean electric motors and generators.

When manufacturing rotors of electric machines, magnets are inserted into the rotor or the rotor lamination stack. In the rotor, the magnets have different orientations.

In order to insert the magnets into the rotor, their insertion into the rotor or the rotor lamination stack by means of robots is known from the prior art. To this end, the robot, in particular a robot arm, collects magnets from a magazine and inserts them individually into a loading plate or directly into the rotor. In particular, magazine is understood to mean a storage means in which the magnets are stored.

Instead of robots, devices provided especially for this purpose may also be provided for inserting magnets into rotors or lamination stacks.

In this regard, JP 2016 208 695 A, for instance, describes a workpiece insertion device. The workpiece insertion device inserts magnets into an insertion hole of a rotor. For this purpose, the workpiece insertion device comprises a jig part configured for picking up magnets with a predetermined orientation and convey them to the insertion hole.

Alternatively, CN 207 251 402 U describes an automated device for feeding magnets into a rotor. For this purpose, the device comprises guiding arms which separately convey magnets with different orientations to the rotor.

KR 101 972 348 B1 describes a device for inserting a magnet into a rotor core. The device includes a magnet feeding unit, which inserts a magnet into an insertion hole of the rotor core, and a magnet arrangement unit, into which a plurality of magnets supplied by the magnet feeding unit is temporarily inserted before being inserted into the insertion hole of the rotor core. The device further comprises a magnet insertion unit positioned underneath the magnet arrangement unit and above the rotor core, which is moved by a rotor core feeding unit, in order to cause the plurality of magnets, which are temporarily inserted into the magnet arrangement unit, to be inserted into the insertion hole of the rotor core together.

In the rotor of an electric machine, the magnets have different orientations, in particular positional orientations. Mostly, the magnets are all provided having the same orientation, such as in blisters, for instance. Therefore, the magnets have to be brought into a different position or orientation.

SUMMARY OF THE INVENTION

The invention has given itself an object of providing a mounting device, a system and a method by means of which magnets can be fed to a rotor, particularly with the predetermined orientation, in a particularly simple, rapid and confident manner.

The invention provides a mounting device for inserting magnets into magnet accommodating portions of a rotor of an electric machine. The term magnet accommodating portions denotes, in particular, channels or depressions configured for accommodating magnets. For example, the magnets may be stacked one atop the other in the magnet accommodating portions. In particular, a shape of the magnet accommodating portions is adapted to a shape of the magnets. If the magnets are configured with a rectangular cross section, for example, the magnet accommodating portions are configured with a rectangular cross section.

The mounting device comprises an aligning device configured for accommodating and aligning the magnets. "Aligning" means, in particular, that the aligning device is configured for orientating the magnets or bringing them into a predetermined position. For this purpose, the aligning device for aligning and accommodating the magnets comprises at least one channel. In other words, the magnets can be accommodated in the channel and, due to shape or arrangement of the latter, be moved so as to be aligned or orientated in a predetermined position. "Channel" means, in particular, a duct or tubular connecting passageway. Furthermore, a shape of the at least one channel is adapted to a shape of the magnets. In other words, the cross section of the channel may be adapted to an outer contour of the magnets. If the magnets are configured with a rectangular cross section, for example, the channels are configured with a rectangular cross section. Moreover, the at least one channel is preferably larger to a certain extent than the magnet or magnets, particularly so that the magnet or magnets can glide or slide through the channel.

The channel has a channel inlet, which is disposed at an end face or end surface of the aligning device and via which the magnets can be fed to the channel, and a channel outlet, which is disposed opposite the channel inlet and is disposed at an end face of the aligning device opposite the end face and via which the magnets can be discharged from the channel, in particular for insertion into the magnet accommodating portions of the rotor. In other words, the at least one channel may be configured, due to the channel inlet and the channel outlet, to be open on both sides or ends.

Furthermore, it is provided that the at least one channel is twisted. In this case, the at least one channel can be twisted, in particular, in such a way that the channel inlet and the channel outlet, with respect to a plane of the respective end face, are orientated in different manners relative to each other. In particular, "plane of the respective end face" means a cross-sectional surface coinciding with a transverse plane of the mounting device. In particular, the cross-sectional surface extends perpendicularly to a main extending direction of the mounting device. In other words, the at least one channel may be twisted in such a way that the channel inlet has a different orientation from the channel outlet. In particular, "twisted" means warped or corkscrewed, or that the at least one channel is wound about its own axis.

The aligning device is advantageous in that thus, moving parts for aligning the magnets may be reduced. Moreover, the manufacture or insertion of the magnets into the rotor requires a shorter cycle time. In addition, the magnets can be fed linearly and in the same manner for each magnet. Due to such a specific configuration of the at least one channel, the magnets can be aligned or orientated in a particularly simple and reliable manner, particularly so as to correspond to the alignment or orientation of the magnet accommodating portions.

An advantageous embodiment provides that the mounting device has several channels, wherein the channels, in a circumferential direction of the aligning device, are disposed side-by-side in the aligning device and extend through the aligning device, in particular in a main extending direction of the mounting device, from the end face of the aligning device to the opposite end face of the aligning device. Moreover, the aligning device preferably has the shape of a cylinder or a cylindrical shape. In this case, the end faces preferably form the round base areas of the cylindrical aligning device. Particularly preferably, the respective channels are twisted in a clockwise and/or counter-clockwise direction. For example, the channels are twisted alternately in a clockwise and a counter-clockwise direction. Thus, the channel outlets of the channels arranged side-by-side are disposed in a zig-zag shape in the circumferential direction. Moreover, the channel outlets, in particular in an alternating manner, are inclined towards a radius of the aligning device, particularly the end face, and/or away from the radius of the aligning device. Due to the several channels, several, or even all, of the magnet accommodating portions can be filled at once. Thus, time and costs may be saved in the production of rotors.

An advantageous refinement provides that the mounting device has a feeding device configured for feeding the magnets individually to the at least one channel via the channel inlet of the aligning device. Preferably, the magnets of the aligning device can be supplied consecutively by the feeding device. The feeding device preferably has a cylindrical shape or the shape of a cylinder. The magnets of the aligning device can be supplied particularly simply and reliably by the feeding device.

Another advantageous embodiment provides that the feeding device has at least one feeding region configured for accommodating one magnet in each case, wherein the at least one feeding region is associated with or allocated to the at least one channel or the channel inlet of the at least one channel of the aligning device. In this case, the at least one feeding region and the at least one channel, in the main extending direction of the aligning device, are disposed next to each other in such a way that a magnet can be inserted from the feeding region via the channel inlet into the channel. Preferably, a shape of the feeding region is adapted to a shape of the magnet and/or the channel, particularly with respect to the cross section. In particular, the feeding region has a U-shape or a rectangular contour. Due to the at least one feeding region, the magnets can be accommodated and fed to the at least one channel in a particularly reliable manner.

Advantageously, the feeding device includes a transporting unit, wherein the transporting unit is configured for pushing the magnets radially into the at least one feeding region of the feeding device. For this purpose, the feeding region is preferably open on one side or configured with a U-shape.

Particularly preferably, the aligning device has several channels. Moreover, the feeding device preferably has several feeding regions. In this case, the feeding regions can be disposed side-by-side in the circumferential direction of the feeding device. Moreover, one feeding region may in each case be associated with or allocated to a channel or channel inlet. Preferably, a number of the feeding regions matches a number of channels of the aligning device.

Advantageously, the mounting device has an accommodating device configured, in particular, as a loading plate. Preferably, the accommodating device is configured for accommodating the magnets from the aligning device. Moreover, the accommodating device has at least one accommodating portion, wherein the at least one accommodating portion is associated with or allocated to the at least one channel. The magnets fed to the channel can be fed to the accommodating portion associated with the channel via the channel outlet, wherein an orientation of the at least one accommodating portion is adapted to an orientation of the channel outlet, particularly for feeding the magnets into the at least one accommodating portion. The accommodating device preferably has a cylindrical shape or the shape of a cylinder. The at least one accommodating portion is preferably channel-shaped and/or adapted to a shape of the magnets. Preferably, the at least one accommodating portion extends in the main extending direction from the end face of the accommodating device to the opposite end face of the accommodating device. Preferably, the at least one feeding region, the at least one channel and the at least one accommodating portion are disposed, in the main extending direction of the mounting device, next to one another or successively and/or associated with or allocated to one another.

According to an advantageous refinement, it may be provided that the aligning device is disposed between the feeding device and the accommodating device. Preferably, the feeding device and the accommodating device may be coupled or connected to each other.

Another advantageous embodiment provides that the accommodating portion and the channel outlet, in a main extending direction of the mounting device, are disposed, in particular, in a congruent manner, next to one another or one atop the other. Preferably, the accommodating device has several accommodating portions, wherein one accommodating portion is in each case associated with or allocated to one channel outlet. Preferably, the number of accommodating portions matches the number of channels. In particular, an orientation or alignment of the accommodating portion is adapted to an orientation or alignment of the channel outlet. Preferably, the accommodating portion is also configured as a channel or duct. Preferably, the accommodating portions extend in a main extending direction of the mounting device, particularly in a straight manner, through the accommodating device. Particularly preferably, the accommodating portions arranged side-by-side are disposed in a zig-zag shape in the circumferential direction. Thus, the accommodating portions are inclined, in particular in an alternating manner, towards a radius of the accommodating device and/or away from the radius of the accommodating device. Due to the several accommodating portions, several, or even all, of the magnet accommodating portions can be filled at once. Thus, time and costs may be saved in the production of the rotor.

An advantageous embodiment provides that the aligning device is rotatably supported about an axis of the mounting device. In particular, the alignment device or the mounting device has a rotation axis. Particularly preferably, the aligning device may be configured as a turret. In addition or alternatively, it may be provided that the accommodating device and/or the feeding device is rotatably supported about an axis of the mounting device. As an alternative, it may be provided that the feeding device and the aligning device are combined to form a turret.

According to an advantageous refinement, it is provided that the at least one channel is configured to open towards an outer surface of the aligning device, wherein the outer surface of the aligning device extends perpendicularly from the end face of the aligning device to the opposite end face of the aligning device. In other words, the channel is preferably configured to be opened towards a jacket surface of the aligning device. Particularly preferably, at least one braking member, particularly a brush, which is adapted for regulating a fall velocity of the magnets in the at least one channel, is disposed in an opening of the at least one channel. In particular, the opening extends from the end face of the aligning device to the opposite end face of the aligning device. In particular, the opening extends with an inclination of a predetermined angle to a main extending direction of the mounting device. In particular, a length of the opening, in particular in the main extending direction, matches a length of the at least one channel. In particular, the channel is divided into two channel regions by the opening. A first channel region of the channel regions may be configured for accommodating and aligning the magnets. A second channel region of the channel regions may be configured for accommodating the braking member. Using the braking member, a velocity during filling or feeding the magnets can be adjusted or monitored or regulated in a particularly simple manner.

Advantageously, the mounting device has a moving device which, in particular, comprises at least one plunger, wherein the mounting device is configured for exerting a force, in particular in the main extending direction of the mounting device, on the magnets in the at least one channel. In particular, the moving device is configured for pressing on the magnets in the channel or pressing the magnets downwards in the channel. If the aligning device has several channels, the moving device may preferably have several plungers, wherein one plunger is disposed in each channel, or one plunger is associated with or allocated to one channel in each case. In particular, "plunger" means a preferably cylindrical component for transmitting, in particular percussive, movements from one machine element to another, i.e., particularly the magnets.

Another advantageous embodiment provides that the mounting device has a sliding member disposed at the end face on which the channel outlet is disposed, wherein the sliding member is configured for shutting at least one channel outlet in a holding position and for clearing the at least one channel outlet in a clearing position. Furthermore, the sliding member is slidably supported, in particular linearly, in a direction perpendicular to the main extending direction of the mounting device. Preferably, the sliding member is configured in a plate-shaped manner or as a plate. In particular, the sliding member has a rectangular shape. Moreover, the sliding member is configured in such a way that the sliding member is configured for fully covering or overlaying the end face in the holding position.

If the mounting device includes the accommodating device, an alternative advantageous embodiment provides that the mounting device has a sliding member disposed at an underside of the accommodating device opposite the aligning device. The sliding member is configured for shutting at least one accommodating portion outlet in a holding position and for clearing the at least one accommodating portion outlet in a clearing position, wherein the sliding member is slidably supported in a direction perpendicular to the main extending direction of the mounting device. Moreover, the sliding member can be configured in such a way that the sliding member is configured for fully covering or overlaying the underside of the accommodating device in the holding position. Due to the sliding member, a point in time at which the magnets are transported into magnet accommodating portions of the rotor can be predetermined in a particularly simple and reliable manner.

The invention also includes a system comprising a rotor, in particular for an electric machine, and a mounting device. In this case, the mounting device is configured in accordance with the mounting device according to the invention. Preferably, the rotor is configured to be stationary within the system. In particular, stationary means that the rotor does not move or is static particularly during mounting or inserting the magnets into the rotor. In particular, the magnet accommodating portions have a channel-shaped configuration and extend from one end face of the rotor to an opposite end face of the rotor in a main extending direction of the rotor. In this case, the main extending direction of the rotor coincides, in particular, with the main extending direction of the mounting device.

According to an advantageous embodiment, it is provided that the sliding member is disposed between the rotor and the aligning device, wherein the rotor has magnet accommodating portions, wherein, in each case, one magnet accommodating portion is associated in each case with one channel or channel outlet of the accommodating device, wherein an orientation of the channel outlet is adapted to an orientation of the magnet accommodating portions. The magnet accommodating portions are disposed side-by-side in a circumferential direction of the rotor, wherein the magnet accommodating portions are disposed with an inclination of a predetermined angle to a radius of the rotor. Preferably, the sliding member is configured for moving from the holding position, in which the sliding member shuts the channel outlet, into the clearing position, in which the sliding member clears the channel outlet, as soon as the channel is at least partially, i.e., completely or partially, filled with magnets.

If the mounting device preferably comprises the accommodating device, an alternative advantageous embodiment provides that the sliding member is disposed between the rotor and the accommodating device, wherein the rotor has magnet accommodating portions, wherein, in each case, one magnet accommodating portion is associated in each case with one accommodating portion of the accommodating device, wherein an orientation of the accommodating portions is adapted to an orientation of the magnet accommodating portions. In this case, the magnet accommodating portions are disposed side-by-side in a circumferential direction of the rotor, wherein the magnet accommodating portions are disposed with an inclination of a predetermined angle to a radius of the rotor. Preferably, the sliding member is configured for moving from the holding position, in which the sliding member shuts the accommodation portion outlet, into the clearing position, in which the sliding member clears the accommodation portion outlet, as soon as the accommodating portion is at least partially, i.e. completely or partially, filled with magnets.

Finally, the invention also includes a method for inserting magnets into magnet accommodating portions of a rotor of an electric machine with a mounting device. In a first method step, magnets are being provided. Then, the magnets are pushed, in particular radially, into at least one feeding region of the feeding device, particularly by means of the transporting unit, whereby the magnets, in particular individually one after the other, arrive in the channel, from the feeding region via at least one channel inlet, and are aligned therein.

Advantageously, the channel is at least partially filled with magnets. In addition or alternatively, the sliding member, in a further method step, can be moved from the holding position, in which the sliding member shuts the at least one channel outlet, into the clearing position, in which the sliding member clears the at least one channel outlet, as soon as the at least one channel is at least partially or completely filled with magnets. In addition or alternatively, the magnets, in a further method step, can be transported or inserted or fed from the at least one channel into the magnet accommodating portion of the rotor associated with the at least one channel.

If the mounting device preferably comprises the accommodating device, an alternative advantageous embodiment provides that at least one accommodating portion of the accommodating device is filled by the magnets transported through the channel into the at least one accommodating portion associated with the channel. In addition or alternatively, the sliding member, in a further method step, can be moved from the holding position, in which the sliding member shuts the accommodation portion outlet, into the clearing position, in which the sliding member clears the accommodation portion outlet, as soon as the accommodating portion is at least partially filled with magnets. In addition or alternatively, the magnets, in a further method step, can be transported from the accommodating portion into the magnet accommodating portion of the rotor associated with the accommodating portion.

The invention also includes refinements of the system according to the invention and of the method according to the invention, which comprise features as they were already described in connection with the refinements of the mounting device according to the invention. For this reason, the respective refinements of the system according to the invention and of the method according to the invention are not described again herein.

BRIEF DESCRIPTION OF THE DRAWINGS

An exemplary embodiment will be explained in more detail below with reference to the attached drawings. In the drawings.

The exemplary embodiments explained below are preferred embodiments of the invention. In the exemplary embodiments, the described components of the embodiments each constitute individual features of the invention, which are to be considered independently of each other and which also develop the invention independently from each other in each case, and are thus to be deemed constituent elements of the invention individually or in a combination other than that which is shown. Moreover, the described embodiments can also be supplemented with further features of the invention already described.

DETAILED DESCRIPTION OF THE PREFERRED EMBODIMENTS

Figure 1:
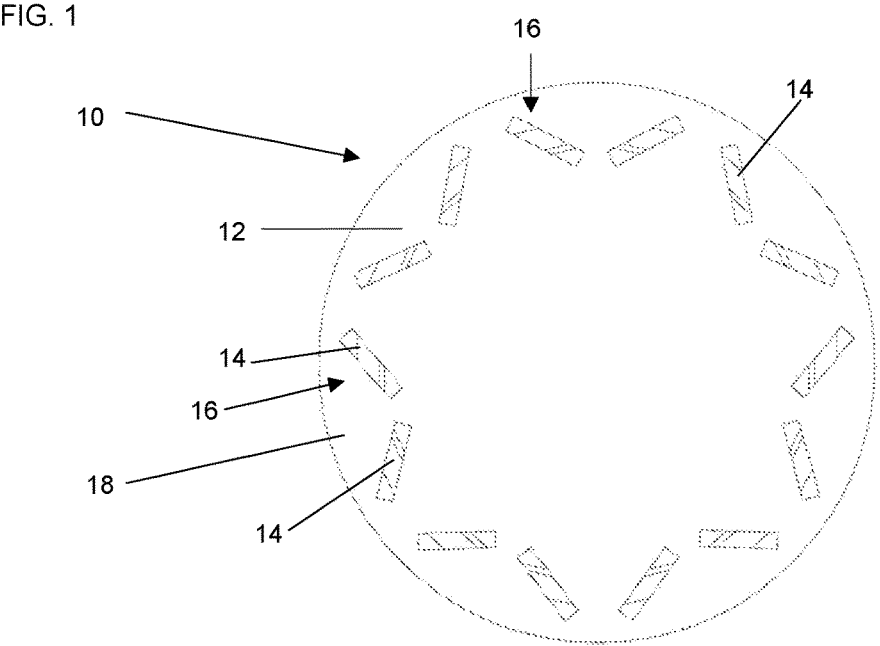
FIG. 1 shows a schematic representation in a sectional view of a rotor of an electric machine, wherein magnets are disposed with a predetermined orientation in magnet accommodating portions of the rotor.

In a schematic representation, FIG. 1 shows a rotor 10 for an electric machine. Electric machines are understood to be, in particular, machines for converting electric energy into kinetic energy and/or machines for converting kinetic energy into electric energy. In particular, this term is to be understood to mean electric motors and generators.

The rotor 10 comprises a lamination stack 12 and magnets 14. For clearness' sake, not all magnets 14 are provided with a reference numeral. The magnets 14 are accommodated in the lamination stack 12 of the rotor 10. For this purpose, the rotor 10 comprises magnet accommodating portions 16 in which the magnets 14 are disposed or accommodated. In particular, the magnet accommodating portions 16 are adapted to a shape of the magnets 14. In this case, the magnets 14 have a rectangular shape in cross section. Accordingly, the magnet accommodating portions 16 are also configured with a rectangular cross section. The magnet accommodating portions 16 are configured as a channel or duct or depression. In particular, the magnet accommodating portions 16 extend, in particular in a straight manner or in a main extending direction of the rotor 10, from one end face 18 of the rotor 10 to an opposite end face of the rotor 10 in the main extending direction. In particular, the main extending direction of the rotor 10 extends in the direction of a rotation axis of the rotor 10. The magnet accommodating portions 16 and/or the magnets 14 are disposed side-by-side in a circumferential direction of the rotor 10, in particular, at a predetermined distance from one another. The magnets 14 and/or the magnet accommodating portions 16 have a predetermined orientation in the rotor 10 or in the lamination stack 12 of the rotor 10. The lamination stack 12 of the rotor 10 has a cylindrical shape. As is apparent from FIG. 1, the magnets 14 and/or magnet accommodating portions 16 are alternately inclined towards a radius of the lamination stack 12 of the rotor 10 or away from a radius of the lamination stack 12 of the rotor 10. On the whole, the magnet accommodating portions 16 or the magnets 14 are disposed in the rotor 10 or in the lamination stack 12 of the rotor 10 in a zig-zag arrangement.

Figure 2:
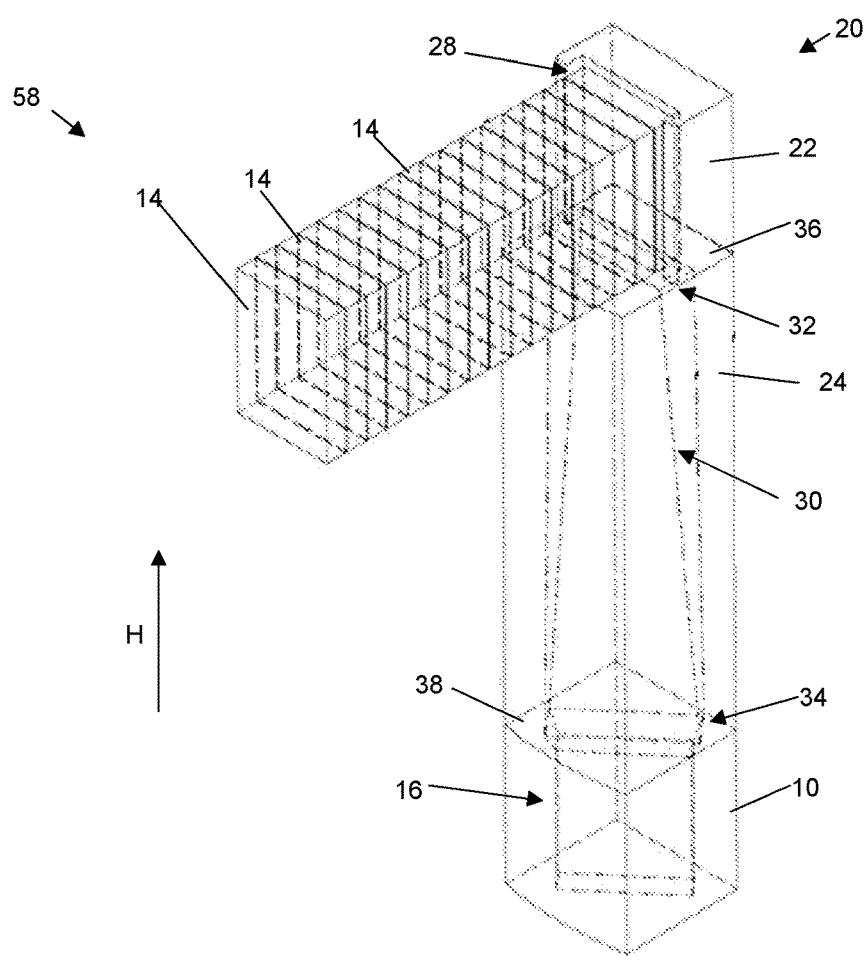
FIG. 2 shows a schematic representation in a perspective view of a portion of a system with a mounting device comprising a feeding device and an aligning device, and a rotor.
Figure 3A:
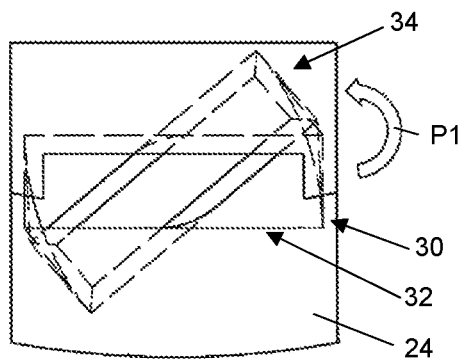
FIG. 3a shows a schematic representation in a sectional view of a channel of the aligning device twisted in a counter-clockwise direction.
Figure 3B:
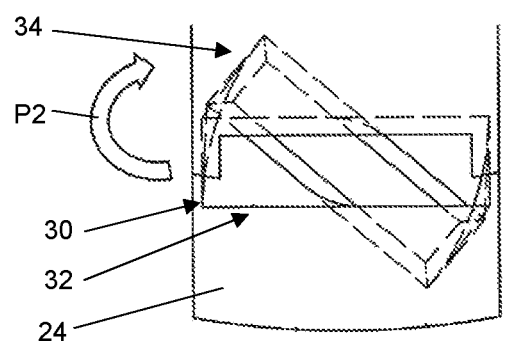
FIG. 3b shows a schematic representation in a sectional view of a channel of the aligning device twisted in a clockwise direction.
Figure 9:
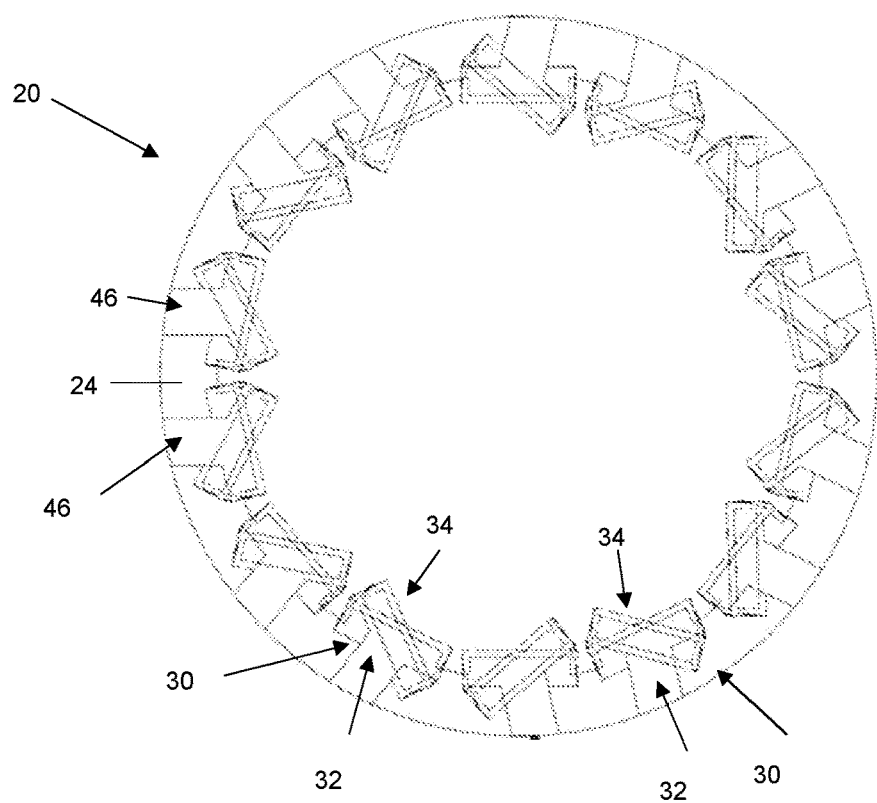
FIG. 9 shows a schematic representation in a sectional view of another embodiment of the mounting device with opened channels of the aligning device.
Figure 10:
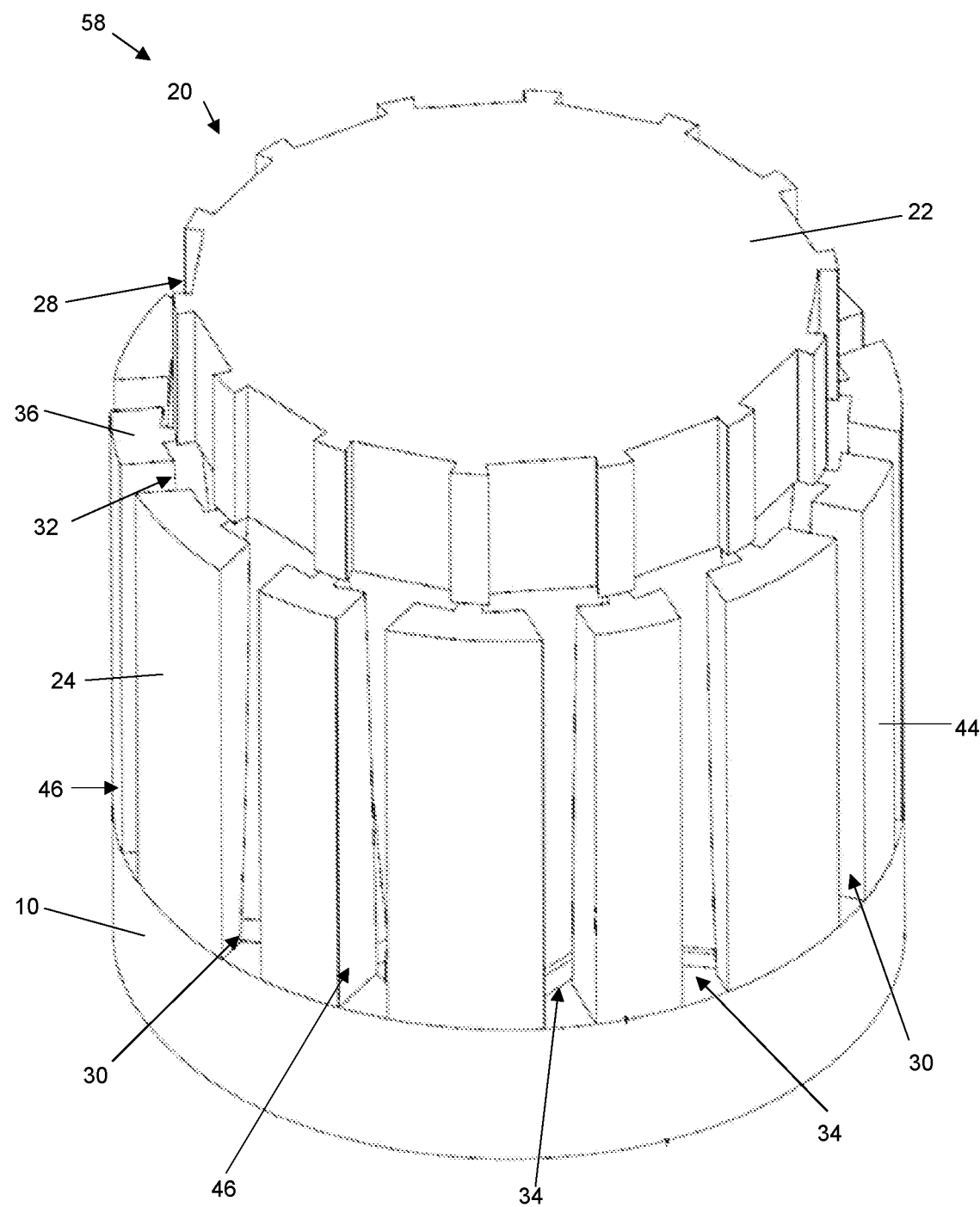
FIG. 10 shows a schematic representation of the system with the mounting device of FIG. 9 in a perspective view.
Figure 11:
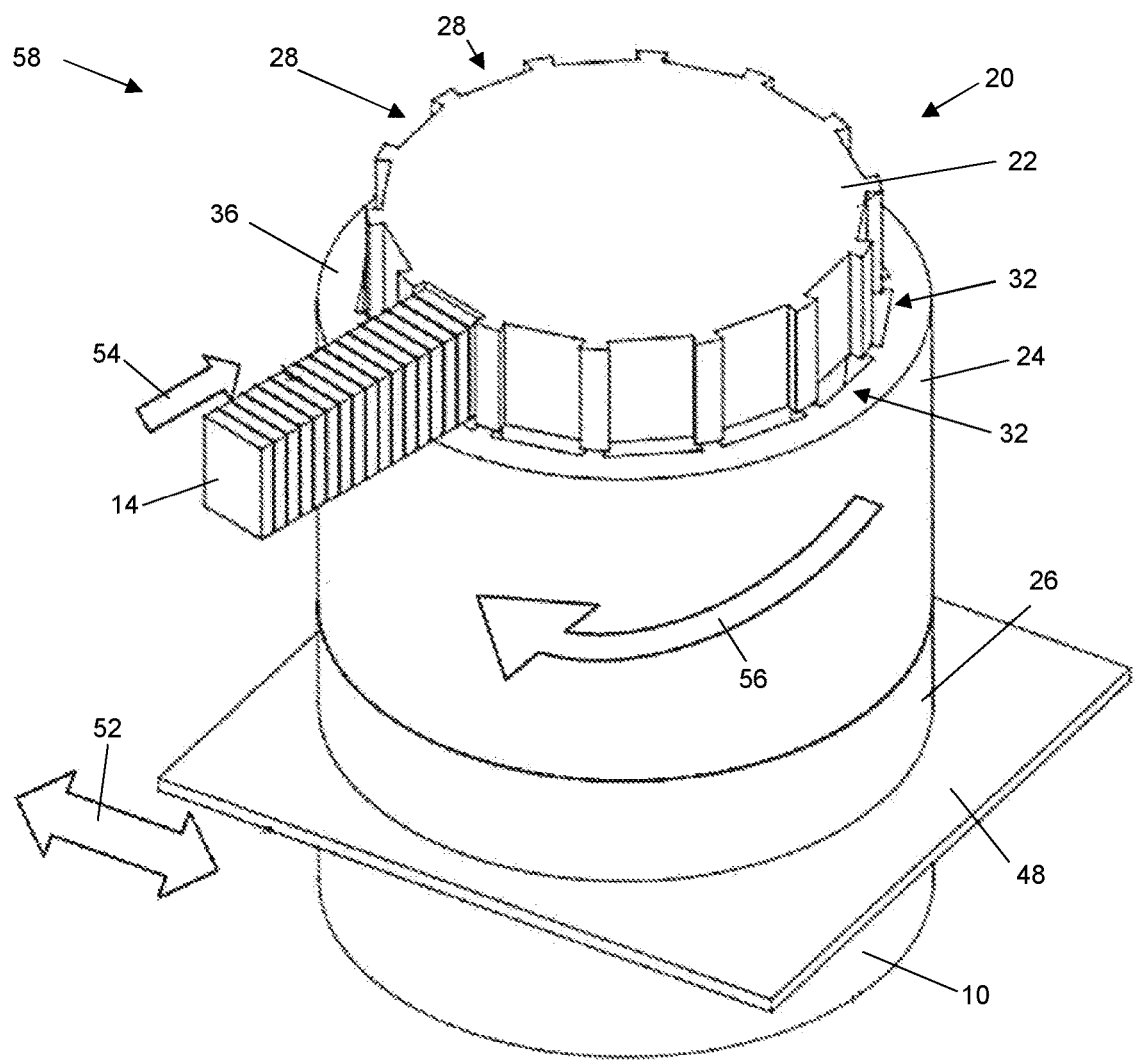
FIG. 11 shows a schematic representation in a perspective view of the system with another embodiment of the mounting device comprising a feeding device, an aligning device, an accommodating device and a sliding member, and the rotor.
Figure 12:
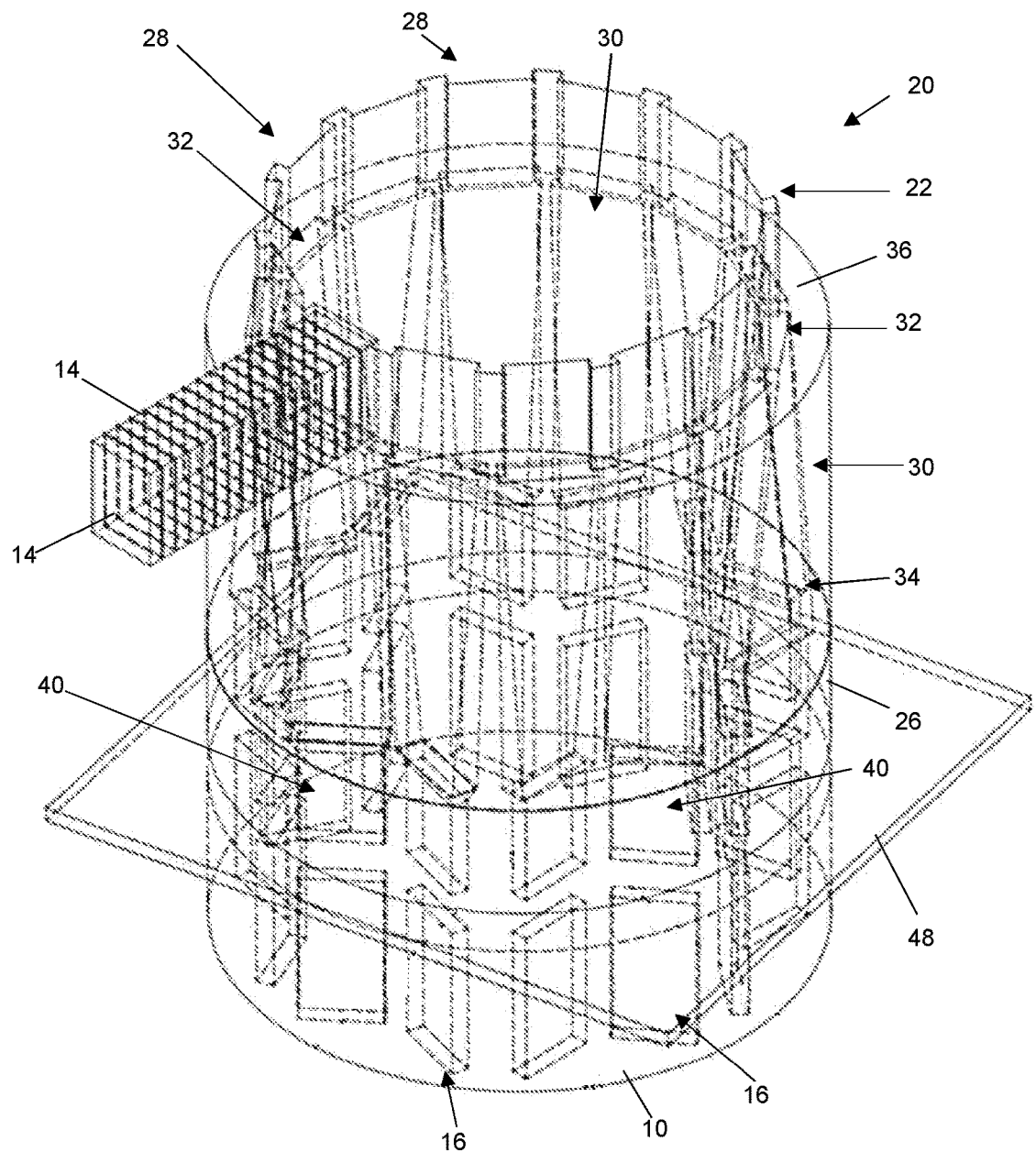
FIG. 12 shows a schematic representation of the system of FIG. 11 in another perspective view.
Figure 13:
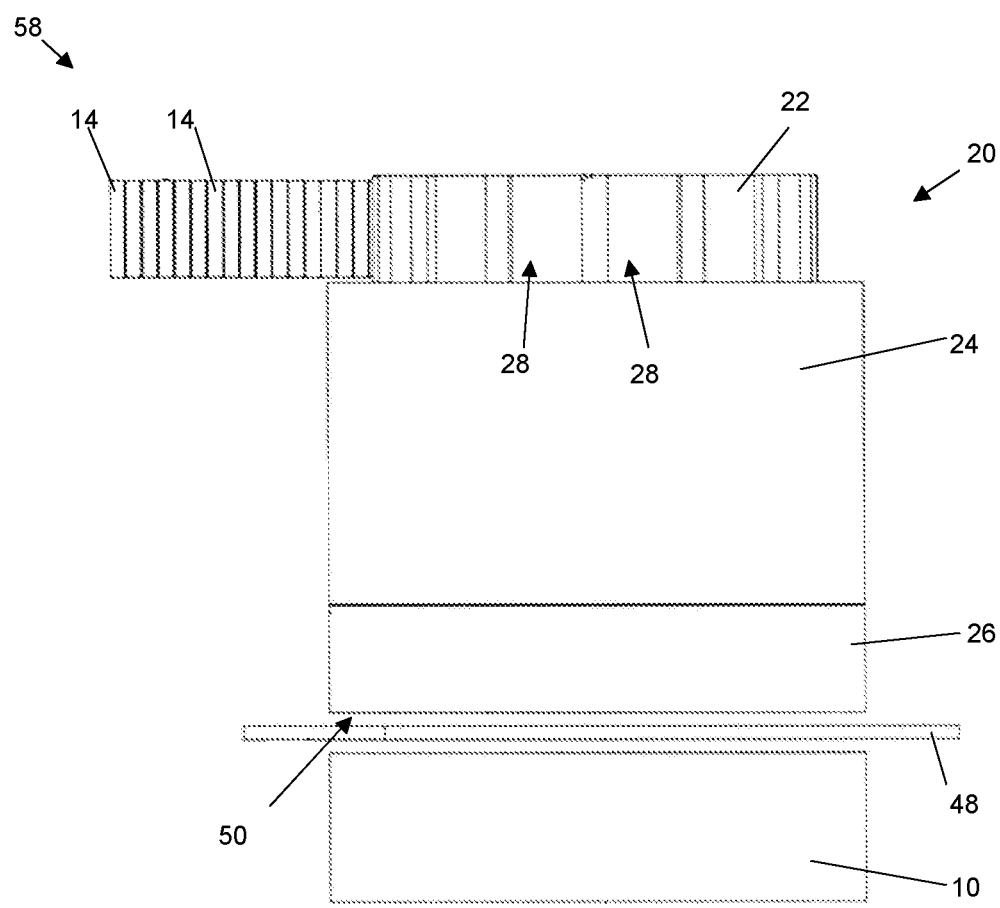
FIG. 13 shows a schematic representation of the system of FIG. 11 in a side view.

A mounting device 20 is provided in order to be able to bring the magnets 14 into a predetermined arrangement or orientation, in particular in the magnet accommodating portions 16 of the rotor 10. FIGS. 2, 3a and 3b show a portion of the system with the mounting device 20. FIGS. 4 to 8 show the system 58 with another embodiment of the mounting device 20. FIGS. 9 and 10 show the system 58 with another embodiment of the mounting device 20. FIGS. 11 to 13 show a system 58 with another embodiment of the mounting device 20 and the rotor 10. In connection with the FIGS. 2 to 10, the system 58 and the mounting device 20 with its embodiments and a method for mounting the rotor 10 with the magnets 14 are to be discussed in more detail.

As is apparent from FIG. 2, the system 58 comprises the mounting device 20, which has a feeding device 22 and an aligning device 24, and the rotor 10. Instead of the rotor 10 being adjacent to the aligning device 24, it may be provided that an accommodating device 26 is adjacent to the aligning device 24, as is shown in FIGS. 11 to 13. Thus, instead of the rotor 10 being adjacent to the aligning device 24, it may be provided that the accommodating device 26, in accordance with the schematic arrangement as shown in FIGS. 2 to 5, is adjacent to the aligning device 24.

In particular, in a vertical direction or main extending direction H of the feeding device 22 or of the system 58, the aligning device 24 is disposed between the feeding device 22 and the rotor 10 or the accommodating device 26. The feeding device 22 is configured for feeding magnets 14 to the aligning device 24. For this purpose, the feeding device 22 has at least one feeding region 28. The feeding region 28 is adapted for accommodating one magnet 14 in each case. The feeding region 28 has an opening via which one magnet 14 of the magnets can be fed in each case to the feeding region 28. Due to the opening on one side, the feeding region 28 preferably has a U-shape. In other words, the feeding region 28 may be formed by a U-shaped depression in the feeding device 22. A shape of the feeding region 28 is adapted, in particular, to a shape or contour of the magnet 14 to be accommodated. Furthermore, the mounting device 20 has a transporting unit (not shown in the Figures), which is configured for feeding the magnets 14, in particular radially, to the feeding region 28. An alignment or orientation of the feeding region 28 is adapted to an alignment or orientation of the channel inlet 32.

The aligning device 24 has at least one channel 30 configured for accommodating and aligning the magnets 14. The shape of the at least one channel 30 is adapted, in particular, to a shape or contour of the magnet 14. The magnets 14 arrive via a channel inlet 32 in the channel 30 and are discharged from the channel 30 via a channel outlet 34 opposite the channel inlet 32. In this case, the channel inlet 32 is disposed at an end face 36 of the aligning device 24, and the channel outlet 34 is disposed at an end face 38 of the aligning device 24 opposite the end face 36. Preferably, the channel outlet 34, or an end region of the channel 30 leading into the channel outlet 34, has a funnel shape. In order for the magnet 14 or magnets 14 to be able to glide or slide or move, in particular individually one after the other, through the at least one channel 30, an extent or dimension of the channel 30, in particular with respect to a cross section of the mounting device 20, is preferably greater than an extent or dimension of the magnet 14 or magnets.

The at least one feeding region 28 of the feeding device 22 is associated with or allocated to the channel 30 of the aligning device 24. In this case, the at least one feeding region 28 and the at least one channel 30, in the main extending direction H of the aligning device 24, are disposed next to each other in such a way that a magnet 14 can be inserted from the feeding region 28 via the channel inlet 32 into the channel 30.

The magnets 14 arrive from the at least one channel 30 of the aligning device 24 via the channel outlet 34 in the rotor 10 or the lamination stack 12 of the rotor 10. For this purpose, the rotor 10 comprises the magnet accommodating portions 16. The magnet accommodating portions 16 are configured as a channel or duct. In this case, a shape of the magnet accommodating portion 16 is adapted, in particular with regard to the cross section, to a shape of the magnets 14. Furthermore, an orientation or alignment of the magnet accommodating portions 16 is adapted to an orientation or alignment of the channel outlet 34. The magnet accommodating portions 16 extend, in particular in a straight manner in the main extending direction of the rotor 10 or of the system 58, from the one end face 18 of the rotor 10, which faces towards the channel outlet 34, in particular, to an opposite end face of the rotor 10 or of the lamination stack 12. The magnet accommodating portions 16 are configured for accommodating the magnets 14, in particular in the vertical direction or main extending direction of the rotor 10 or of the system 58. Preferably, the magnets 14 are stacked one atop the other in the magnet accommodating portions 16 of the lamination stack 12 in the vertical direction or main extending direction H of the system 58 or of the rotor 10.

If the system 58, as is shown in FIGS. 11 to 13, comprises the accommodating device 26, the magnets 14 first arrive, from the at least one channel 30 of the aligning device 24 via the channel outlet 34, in the accommodating device 26. The accommodating device 26 is preferably configured as a loading plate. As is shown in FIG. 12, the accommodating device 26 has at least one accommodating portion 40. The at least one accommodating portion 40 is configured as a channel or duct. In this case, a shape of the accommodating portion 40 is adapted, in particular with regard to the cross section, to a shape of the magnets 14. Furthermore, an orientation or alignment of the at least one accommodating portion 40 is adapted to an orientation or alignment of the channel outlet 34. The accommodating portion 40 extends, in particular in a straight manner in the main extending direction H of the mounting device 20, from one end face of the accommodating device 26, which faces towards the channel outlet 34, in particular, to an opposite end face of the accommodating device 26. The at least one accommodating portion 40 is configured for accommodating the magnets 14, in particular in the vertical direction or main extending direction H of the system 58 or the mounting device 20. Preferably, the magnets 14 are stacked one atop the other in the accommodating portion 40 of the accommodating device 26 in the vertical direction or main extending direction H of the system 58 or the mounting device 20.

As is apparent from FIGS. 3a and 3b, the at least one channel 30 of the aligning device 24 is twisted. In particular, "twisted" means that the at least one channel 30 is rotated about an axis. In particular, the channel inlet 32 has an orientation or alignment different from that of the channel outlet 34. In FIG. 3a, the at least one channel 30 is rotated or twisted in the counter-clockwise direction, as illustrated by the arrow P1. In FIG. 3b, the at least one channel 30 is rotated or twisted in the clockwise direction, as illustrated by the arrow P2.

Figure 4:
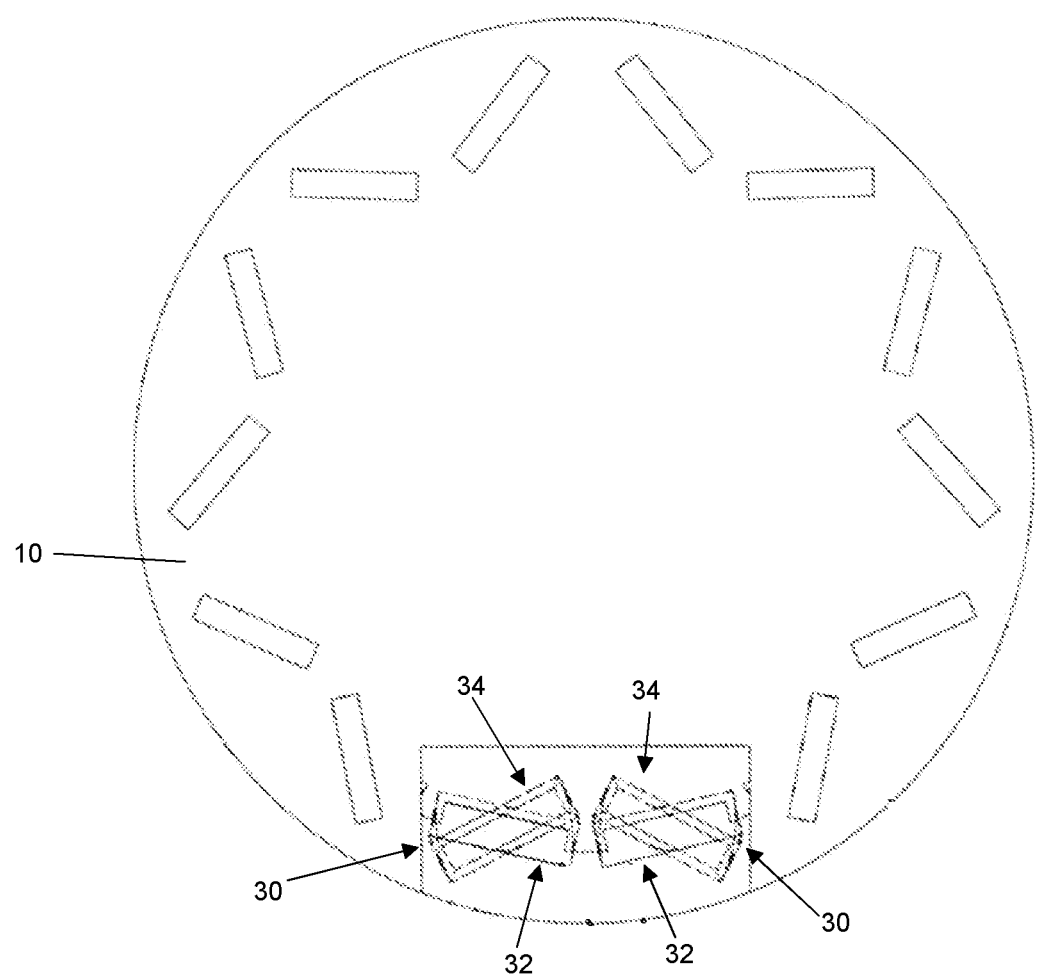
FIG. 4 shows a schematic representation in a sectional view of the system with the aligning device, with a portion of two channels disposed side-by-side, which are twisted in a clockwise and counterclockwise direction, and the rotor.
Figure 5:
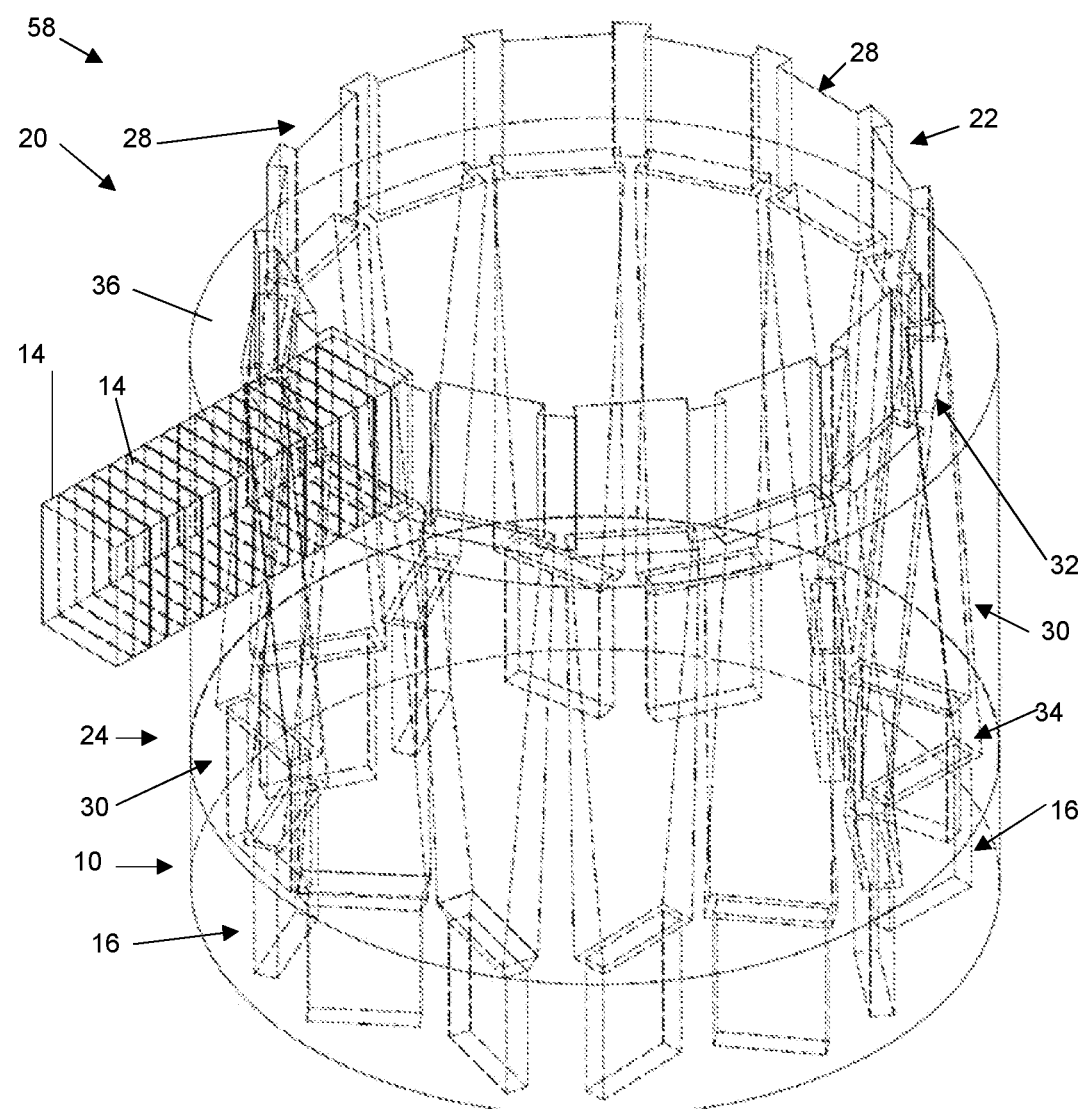
FIG. 5 shows a schematic representation in a perspective view of the system with a further embodiment of the mounting device comprising a feeding device and an aligning device.

As is apparent from FIGS. 4 and 5, the aligning device 24 has several channels 30, wherein the channels 30, in a circumferential direction of the aligning device 24, are disposed side-by-side in the aligning device 24. For clearness' sake, not all channels 30, feeding regions 28 or magnet accommodating portions 16 are provided with a reference numeral. In this case, the channels 30 extend through the aligning device 24, in particular in the main extending direction H of the mounting device 20, from the end face 36 of the aligning device 24 to the opposite end face 38 of the aligning device 24. The channels 30 are alternately twisted in the clockwise and counter-clockwise directions; in particular, the channels 30, starting from the channel inlet 32, are twisted in such a way that the channel outlets 34 have a different orientation from the channel inlets 32.

As is apparent from FIG. 5, the feeding device 22 of the mounting device 20 has several feeding regions 28, and the rotor 10 or the lamination stack 12 of the rotor 10 has several magnet accommodating portions 16. In particular, one feeding region 28, one channel 30 and one magnet accommodating portion 16 are in each case associated with each other. In the exemplary embodiments, the mounting device 20 has 14 feeding regions 28, 14 channels and 14 magnet accommodating portions 16. Furthermore, an orientation or alignment of the magnet accommodating portions 16 is adapted to an orientation or alignment of the channel outlet 34 associated with the magnet accommodating portion 16. As is apparent from FIG. 5, the magnet accommodating portions 16 are alternately inclined towards a radius of the rotor 10 or away from a radius of the rotor 10. On the whole, the magnet accommodating portions 16 are disposed in the lamination stack 12 in a zig-zag arrangement.

If the system 58, as is shown in FIGS. 11 to 13, also comprises the accommodating device 26, the accommodating device 26 of the mounting device 20 preferably has several accommodating portions 40. In particular, one feeding region 28, one channel 30 and one accommodating portion 40 and/or one magnet accommodating portion 16 of the rotor 10 are in each case associated with each other. In the exemplary embodiments, the mounting device 20 has 14 feeding regions 28, 14 channels and 14 accommodating portions 40 and/or 14 magnet accommodating portions 16. Furthermore, an orientation or alignment of the accommodating portions 40 is adapted to an orientation or alignment of the channel outlet 34 associated with the accommodating portion 40. The accommodating portions 40 of the accommodating device 26 are in this case orientated like the magnet accommodating portions 16 of the rotor 10. As is analogously apparent from FIG. 5 with respect to the rotor 10, the accommodating portions 40 of the accommodating device 26 depicted in FIGS. 11 to 13 are alternately inclined towards a radius of the accommodating device 26 or away from a radius of the accommodating device 26. On the whole, the accommodating portions 40 are disposed in the accommodating device 26 in a zig-zag arrangement.

Figure 6:
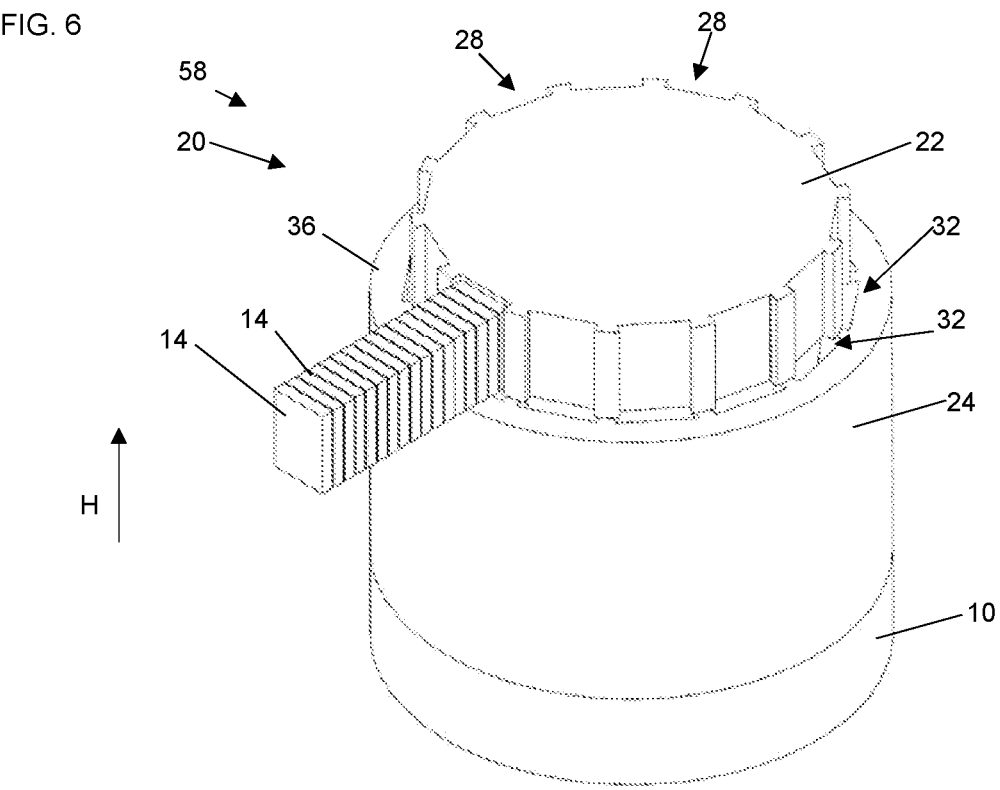
FIG. 6 shows a schematic representation of the system of FIG. 5 in a perspective view.
Figure 7:
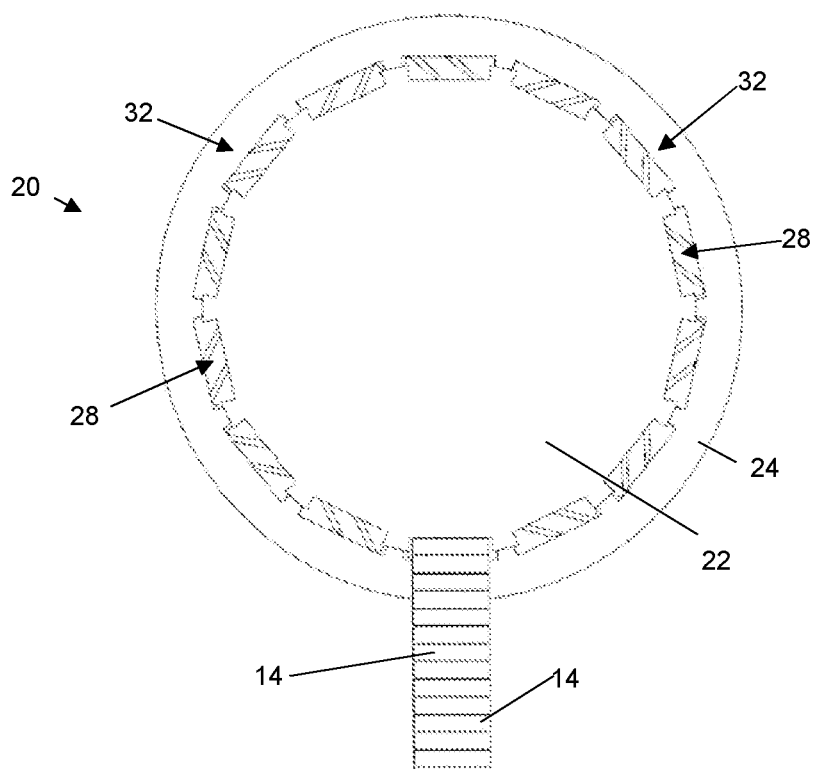
FIG. 7 shows a schematic representation of the system of FIG. 5 in a plan view.

As is apparent from FIGS. 5 to 7, the feeding device 22 preferably has several feeding regions 28. In this case, one feeding region 28 is respectively associated with or allocated to a channel inlet 32 of the channels 30 of the aligning device 24. The feeding device 22, the aligning device 24 and the accommodating device 26 have a cylindrical shape, as is apparent from FIGS. 5, 6, 11 and 12. As is apparent from FIGS. 5 to 7, the magnets 14 are radially fed to the respective feeding region 28 of the feeding device 22 or inserted or pushed into the corresponding feeding region 28.

Figure 8:
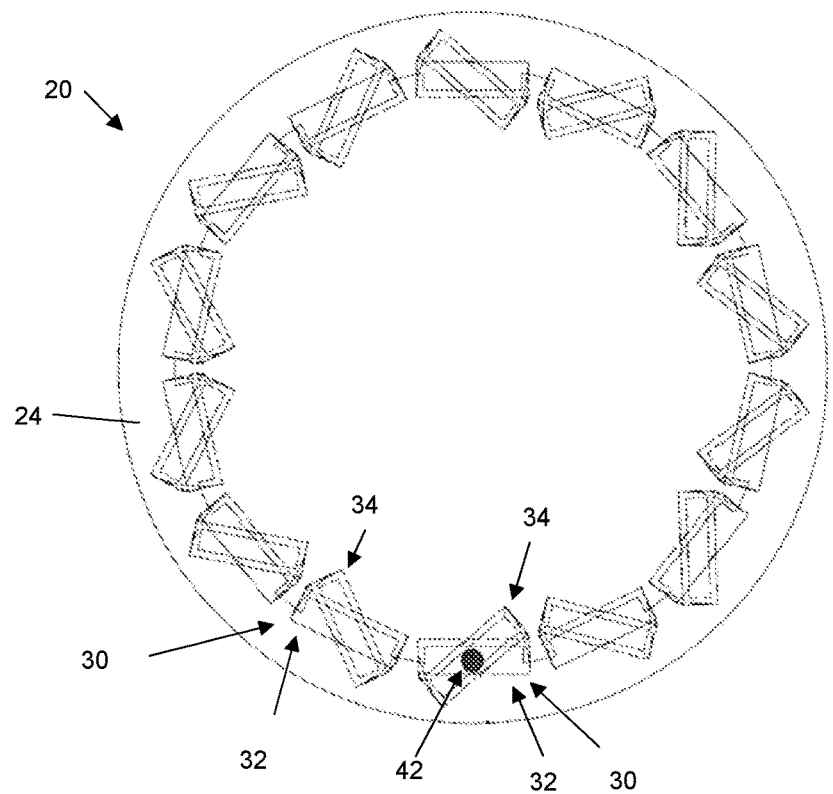
FIG. 8 shows a schematic representation in a sectional view of another embodiment of the mounting device with a moving device.

Moreover, the mounting device 20 may have a moving device 42, as is apparent from FIG. 8. For instance, the moving device 42 may be configured as a plunger. The moving device 42 is configured for exerting a force, in particular in the main extending direction H of the mounting device 20, on the magnets 14 in the channel 30 or channels 30. For example, the moving device 42 may be guided into the respective channel 30 via the channel inlet 32. Preferably, the mounting device 20 has several moving devices 42 or plungers. In particular, one moving device 42 is associated with or allocated to each channel 30.

FIGS. 9 and 10 show another embodiment or refinement of the aligning device 24 of the mounting device 20 of the system 58. In order to regulate a fall velocity of the individual magnets 14 in the channel 30 or channels 30, the mounting device 20 may have a braking member. For this purpose, the channels 30 are opened towards an outer surface 44 of the aligning device 24. The outer surface 44 extends perpendicularly from the end face 36 of the aligning device 24 to the opposite end face 38 of the aligning device 24. Since the aligning device 24 has a cylindrical shape, the outer surface 44 may also be configured as a jacket surface. The end faces or end surfaces preferably form the circular opposite base areas. The braking member or several braking members are disposed or accommodated in the opening 46 or the openings 46, which are disposed, in particular, in the circumferential of the aligning device 24. For example, the braking member may be configured as a brush. Due to the opening 46, the channel or channels 30 may be configured with a T-shape at least in some portions. The channel is divided into 2 channel regions or channel portions by the opening 46. The first channel region is configured like the channel 30 already described in connection with the FIGS. 2 to 8. The second channel region or the opening 46 extends from the first channel region towards the outer surface 44 of the aligning device 24. Furthermore, the opening 46 may extend from the end face 36 of the aligning device 24 towards the opposite end face 38 of the aligning device 24.

As is apparent from FIGS. 11 to 13, the system 58 has an embodiment of the mounting device 20 as well as the rotor 10. According to the embodiment of FIGS. 11 to 13, the mounting device 20 further has a sliding member 48. The sliding member 48 is configured as a plate or plate-shaped member or workpiece. The sliding member 48 is disposed at an underside 50 of the accommodating device 26 opposite the aligning device 24. In this case, the sliding member 48 is configured in such a way that the sliding member 48 completely covers the underside 50 of the accommodating device 26. The sliding member 48 is configured for shutting or closing or covering at least one accommodating portion outlet, preferably all accommodation portion outlets, in a holding position and for clearing or opening the at least one accommodating portion outlet, in particular the accommodating portion outlets, in a clearing position. For this purpose, the sliding member 48 is slidably supported in a direction perpendicular to the main extending direction H of the mounting device 20, as is illustrated by the arrow 52. In other words, the sliding member 48 can be moved back and forth between the holding position and the clearing position.

The radial pushing or moving or transporting of the magnets 14 into the feeding region 28 is illustrated by the arrow 54. Furthermore, the aligning device 24 is rotatably supported about an axis of the mounting device 20, as illustrated by the arrow 56. Preferably, the aligning device 24 is configured as a turret. The sliding member 48 is disposed between the rotor 10 and the accommodating device 26. Furthermore, the feeding device 22 and the accommodating device 26 are coupled or connected to each other.

The method for inserting or mounting the rotor 10 of an electric machine with magnets is described below in more detail:

In a first method step, magnets 14 are being provided. As is apparent from FIG. 11, the magnets 14 are disposed next to one another. Then, the magnets 14 are pushed, in particular radially, into at least one feeding region 28 of the feeding device 22, particularly by means of the transporting unit. Thus, the magnets 14, in particular individually one after the other, arrive in the channel 30, from the feeding region 28 via the at least one channel inlet 32, and are aligned therein. From the channel 30, the magnets 14 arrive directly in the accommodating portion 40 of the accommodating device 26 connected to the channel 30. The accommodating portion 40 is filled by the magnets 14 transported through the channel 30. The magnets 14 are stacked one atop the other the accommodating portion 40. As long as the accommodating portion 40 is being filled with magnets 14, the sliding member 48 is in the holding position, in which the sliding member 48 shuts the accommodation portion outlet. If the accommodating portion 40 has been filled, i.e., completely or partially, the sliding member 48 is moved into the clearing position, in which the sliding member 48 clears the accommodation portion outlet. Thus, the magnets 14, in a further method step, are transported from the accommodating portion 40 into the magnet accommodating portion 16 of the rotor 10 associated with the accommodating portion 40.

An alternative exemplary embodiment will be discussed below:

The aligning device 24 may also be configured as a turret. For this purpose, the magnet feed is preferably stationary. The turret separates the magnets 14, and the magnets 14 are collected through the channels 30 with the correct orientation in the accommodating device 26. The magnets 14 are pushed by the plunger in the channel 30 or fall into the channels 30 due to gravity. In this case, the accommodating device 26 is connected, in particular firmly, with the turret. Once the accommodating device 26 has been filled, the sliding member 48 releases the magnets 14. Then, the magnets can be pushed into the turret. Alternatively, the rotor 10 can be provided directly underneath the aligning device 24; in that case, the mounting device 20 does not comprise an accommodating device 26. In this case, the rotor 10 is, in particular, stationary. Magnets 14 are provided through the stationary feed.

On the whole, the examples show how a device for the automated mounting of magnets in a rotor is provided by the invention.

The magnets are fed to the device and separated. Channels which are twisted and larger to a certain extent than the magnets are located within the device. The magnets can slide into the correct orientation in the channels, without rotating fully.

Thus, the magnets have the orientation as required in the rotor. Depending on the configuration of the channel, the magnets may in this case be rotated both in the clockwise and counter-clockwise directions.

The device may also be configured as a turret. For this purpose, the magnet feed is stationary. The turret separates the magnets. The magnets are pushed or fall into the channels due to gravity. The rotor may be provided directly underneath the device. Both a horizontal and a vertical variant are possible. In this case, the rotor is, in particular, stationary.

The channels may be configured in such a way that plungers can push the magnets into the rotor.

The channels may also be configured to be open. For example, brushes for braking the magnets may be installed.

A device with a loading plate or accommodating device and a slider or sliding member is described as an example below:

Magnets are provided through the stationary feed. The turret separates the magnets, and they are collected through the channels with the correct orientation in the loading plate, i.e., the accommodating device. In this case, the loading plate is connected, in particular firmly, with the turret. Once the loading plate has been filled, the slider, i.e., the sliding member, releases the magnets. Then, the magnets can be pushed into the turret.

The advantages of the invention are that movable parts may be reduced by it. Moreover, the manufacture or insertion of the magnets into the rotor requires a shorter cycle time. In addition, the magnets can be fed linearly and in the same manner for each magnet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Rotor
12 Lamination stack
14 Magnet
16 Magnet accommodating portion
18 End face
20 Mounting device
22 Feeding device
24 Aligning device
26 Accommodating device
28 Feeding region
30 Channel
32 Channel inlet
34 Channel outlet
36 End face
38 End face
40 Accommodating portion
42 Moving device
44 Outer surface
46 Opening
48 Sliding member
50 Underside
52 Arrow
54 Arrow
56 Arrow
58 System H Main extending direction
P1 Arrow
P2 Arrow

The invention claimed is:

1. A mounting device for inserting magnets into magnet accommodating portions of a rotor of an electric machine, comprising:
an aligning device configured to accommodate and align the magnets, wherein
the aligning device to align and accommodate the magnets comprises at least one channel, wherein
a shape of the at least one channel is configured to a shape of the magnets, wherein
the channel has a channel inlet, which is disposed at an end face of the aligning device and via which the magnets can be fed to the channel, and a channel outlet, which is disposed opposite the channel inlet and is disposed at an end face of the aligning device opposite the end face and via which the magnets can be discharged from the channel, wherein
the at least one channel is twisted such that the channel inlet and the channel outlet, with respect to a plane of the respective end face, are orientated in different manners relative to each other.

2. The mounting device according to claim 1,
wherein the mounting device has several channels,
wherein the channels, in a circumferential direction of the aligning device, are disposed side-by-side in the aligning device and extend through the aligning device, in a main extending direction of the mounting device, from the end face of the aligning device to the opposite end face of the aligning device.

3. The mounting device according to claim 2, wherein the respective channels are twisted in at least one of a clockwise or counter-clockwise direction.

4. The mounting device according to claim 1, wherein the mounting device has a feeding device configured to feed the magnets individually to the at least one channel via the channel inlet of the aligning device.

5. The mounting device according to claim 4, wherein at least one of
the feeding device has at least one feeding region configured to accommodate one magnet in each case, wherein the at least one feeding region is associated with the at least one channel of the aligning device, wherein the at least one feeding region and the at least one channel, in a main extending direction of the aligning device, are disposed next to each other in such a way that a magnet is insertable from the feeding region via the channel inlet into the channel; or
the feeding device includes a transporting unit, wherein the transporting unit is configured to push the magnets radially into the at least one feeding region of the feeding device.

6. The mounting device according to claim 1,
wherein the mounting device has an accommodating device, which is configured as a loading plate,
wherein the accommodating device is configured to accommodate the magnets from the aligning device,
wherein the accommodating device has at least one accommodating portion,
wherein the at least one accommodating portion is disposed opposite the at least one channel,
wherein the magnets fed to the channel can be fed via the channel outlet to the accommodating portion associated with the channel,
wherein for feeding the magnets into the at least one accommodating portion, an orientation of the at least one accommodating portion is configured to an orientation of the channel outlet.

7. The mounting device according to claim 6, wherein at least one of:
the aligning device is rotatably supported about an axis of the mounting device,
the aligning device is configured as a turret, or
the accommodating device is rotatably supported about an axis of the mounting device.

8. The mounting device according to claim 1, wherein at least one of:
the at least one channel is configured to open towards an outer surface of the aligning device, wherein the outer surface of the aligning device extends perpendicularly from the end face of the aligning device to the opposite end face of the aligning device; or
at least one braking member, which is configured to regulate a fall velocity of the magnets in the at least one channel, is disposed in an opening of the at least one channel.

9. The mounting device according to claim 1,
wherein the mounting device has a moving device which comprises at least one plunger,
wherein the mounting device is configured to exert a force in a main extending direction of the mounting device, on the magnets in the at least one channel.

10. The mounting device according to claim 1,
wherein the mounting device has a sliding member disposed at the end face on which the channel outlet is disposed,
wherein the sliding member is configured to shut at least one channel outlet in a holding position and to clear the at least one channel outlet in a clearing position,
wherein the sliding member is slidably supported in a direction perpendicular to a main extending direction of the mounting device.

11. The mounting device according to claim 6,
wherein the mounting device has a sliding member disposed at an underside of the accommodating device opposite the aligning device,
wherein the sliding member is configured to shut at least one accommodating portion outlet in a holding position and to clear the at least one accommodating portion outlet in a clearing position,
wherein the sliding member is slidably supported in a direction perpendicular to a main extending direction of the mounting device.

12. A system comprising:
a rotor for an electric machine, wherein the rotor is configured to be stationary within the system; and
a mounting device to align and insert magnets into the rotor according to claim 1.

13. A system comprising:
a rotor for an electric machine, wherein the rotor is configured to be stationary within the system; and
a mounting device to align and insert magnets into the rotor according to claim 11 wherein at least one of:
the sliding member is disposed between the rotor and the aligning device or the accommodating device, wherein the rotor has magnet accommodating portions, wherein, in each case, one magnet accommodating portion is associated in each case with one accommodating portion of the accommodating device, wherein an orientation of the accommodating portions is adapted to an orientation of the magnet accommodating portions, wherein the magnet accommodating portions are disposed side-by-side in a circumferential direction of the rotor, wherein the magnet accommodating portions are disposed with an inclination of a predetermined angle to a radius of the rotor; or the sliding member is configured to move from the holding position, in which the sliding member shuts the at least one channel outlet or the accommodating portion outlet, into the clearing position, in which the sliding member clears the at least one channel outlet or the accommodating portion outlet, as soon as the at least one channel or the accommodating portion is partially or completely filled with magnets.

14. A method for inserting magnets into magnet accommodating portions of a rotor of an electric machine with a mounting device according to claim 4, comprising the steps:

providing magnets;

pushing the magnets into at least one feeding region of the feeding device via a transporting unit, whereby the magnets individually one after the other, arrive in the channel, from the feeding region via at least one channel inlet, and are aligned therein.

15. The method according to claim 6, wherein the mounting device has a feeding device configured to feed the magnets individually to the at least one channel via the channel inlet of the aligning device, wherein the mounting device has a sliding member disposed at an underside of the accommodating device opposite the aligning device, wherein the sliding member is configured to shut at least one accommodating portion outlet in a holding position and to clear the at least one accommodating portion outlet in a clearing position, wherein the sliding member is slidably supported in a direction perpendicular to a main extending direction of the mounting device, comprising at least one of the steps:

providing magnets;

pushing the magnets into at least one feeding region of the feeding device via a transporting unit, whereby the magnets individually one after the other, arrive in the channel, from the feeding region via at least one channel inlet, and are aligned therein, filling the at least one channel of the aligning device with magnets, or at least one accommodating portion of the accommodating device by the magnets transported through the channel into the at least one accommodating portion associated with the channel;

moving the sliding member from a holding position, in which the sliding member shuts the at least one channel outlet or the accommodating portion outlet, into a clearing position, in which the sliding member clears the at least one channel outlet or the accommodating portion outlet, as soon as the at least one channel or the accommodating portion is partially or completely filled with magnets; or transporting the magnets from the at least one channel or the accommodating portion into the magnet accommodating portion of the rotor associated with the at least one channel or the accommodating portion.

\* \* \* \* \*